US012562421B2

(12) United States Patent
Amatucci et al.

(10) Patent No.: US 12,562,421 B2
(45) Date of Patent: Feb. 24, 2026

(54) ENCLOSURES FOR ELECTROCHEMICAL CELLS

(71) Applicant: Rutgers, The State University of New Jersey, New Brunswick, NJ (US)

(72) Inventors: Glenn G. Amatucci, Peapack, NJ (US); Kimberly Scott, New Brunswick, NJ (US); Linda Wu-Sung, Morris Plains, NJ (US); Ryan Mitchell, New Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 659 days.

(21) Appl. No.: 17/214,290

(22) Filed: Mar. 26, 2021

(65) Prior Publication Data

US 2021/0218096 A1 Jul. 15, 2021

Related U.S. Application Data

(63) Continuation of application No. PCT/US2019/060025, filed on Nov. 6, 2019.

(Continued)

(51) Int. Cl.
*H01M 50/186* (2021.01)
*H01G 11/32* (2013.01)
*H01G 11/52* (2013.01)
*H01G 11/68* (2013.01)
*H01G 11/80* (2013.01)
*H01M 50/119* (2021.01)
(Continued)

(52) U.S. Cl.
CPC .......... *H01M 50/186* (2021.01); *H01G 11/32* (2013.01); *H01G 11/52* (2013.01); *H01G 11/68* (2013.01); *H01G 11/80* (2013.01);

*H01M 50/119* (2021.01); *H01M 50/169* (2021.01); *H01M 50/191* (2021.01); *H01M 50/133* (2021.01)

(58) Field of Classification Search
CPC .......................... H01M 50/186; H01M 50/183
See application file for complete search history.

(56) References Cited

U.S. PATENT DOCUMENTS 3,804,671 A      4/1974 Rosansky
4,128,705 A  *  12/1978 Winsel .................. H01M 10/34
                                                   429/185

(Continued)

FOREIGN PATENT DOCUMENTS

CN          102124590 A      7/2011
CN          105261730 A  *  1/2016
(Continued)

OTHER PUBLICATIONS

International Search Report and Written Opinion in corresponding International PCT Application No. PCT/US2019/060025, dated Jan. 20, 2020, 8 pages.

*Primary Examiner* — Barbara L Gilliam
*Assistant Examiner* — Jordan E Berresford
(74) *Attorney, Agent, or Firm* — Greenberg Traurig, LLP

(57) ABSTRACT

A hermetic seal for electrochemical cells. The seal is formed between first and second electronically conductive barrier members. The seal is formed by a cold weld between the first and second barrier members. At least one of the first barrier member and the second barrier member are configured to function as current collectors.

25 Claims, 1 Drawing Sheet

Related U.S. Application Data

(60) Provisional application No. 62/756,959, filed on Nov. 7, 2018.

(51) Int. Cl.
_H01M 50/133_ (2021.01)
_H01M 50/169_ (2021.01)
_H01M 50/191_ (2021.01)

(56)                          References Cited

U.S. PATENT DOCUMENTS

| | | | | | |
|---|---|---|---|---|---|
| 8,389,153 | B2 | 3/2013 | Fujikawa et al. | | |
| 2007/0105014 | A1 * | 5/2007 | Shin | .................... | H01M 50/124 |
| | | | | | 429/152 |
| 2008/0171268 | A1 * | 7/2008 | Yazami | ............. | H01M 10/0567 |
| | | | | | 429/188 |
| 2011/0244286 | A1 * | 10/2011 | Fuhr | ................... | H01M 50/124 |
| | | | | | 29/623.5 |
| 2013/0323580 | A1 * | 12/2013 | Kim | .................... | H01M 50/548 |
| | | | | | 429/179 |
| 2013/0330604 | A1 | 12/2013 | Kroll et al. | | |
| 2017/0155098 | A1 * | 6/2017 | Park | ...................... | H01M 4/668 |
| 2017/0155100 | A1 | 6/2017 | Song et al. | | |

FOREIGN PATENT DOCUMENTS

| | | | | | |
|---|---|---|---|---|---|
| CN | 105336884 | A | | 2/2016 | |
| CN | 112771710 | A * | 5/2021 | ........ | H01M 10/0427 |
| DE | 102017000820 | A1 * | 7/2017 | | |
| GB | 1344565 | A | | 1/1974 | |
| WO | 2008103122 | A1 | | 8/2008 | |
| WO | 2010021792 | A1 | | 2/2010 | |

* cited by examiner

ENCLOSURES FOR ELECTROCHEMICAL CELLS

CROSS-REFERENCE TO RELATED APPLICATION

This application is a continuation application relating to and claiming the benefit of commonly-owned, PCT International Application No. PCT/US2019/060025, filed Nov. 6, 2019, entitled "ENCLOSURES FOR ELECTROCHEMICAL CELLS," which claims priority to and the benefit of U.S. Provisional Patent Application Ser. No. 62/756,959, filed Nov. 7, 2018, entitled "ENCLOSURES FOR ELECTROCHEMICAL CELLS," the contents of each of the foregoing are herein incorporated by reference in its entirety.

TECHNICAL FIELD OF THE INVENTION

The present invention relates to improved packaging for electrochemical cells and, more particularly, batteries and electrochemical double-layer capacitors.

BACKGROUND OF THE INVENTION

There is great demand for electrochemical energy storage systems which store larger amounts of energy per weight and volume. Of these, the amount of energy stored per volume is significantly more important for smaller energy storage devices that are used for personal electronics, biomedical applications and other technologies. A majority of the effort in optimizing energy storage devices for volume has been focused on the active materials, especially in the case of lithium batteries. New positive and negative electrode materials delivering much greater degrees of energy have been developed. Considering such developments, the impact to the community has been less than anticipated for smaller cells, especially those smaller than 1-10 Ah. A significant reason for the lower than anticipated effect on the complete battery energy density rests in inefficient packaging of the battery technology. All high energy battery technology, including lithium batteries, require the use of a hermetic or near hermetic barrier between the chemistry and the ambient atmosphere.

In the space of battery technology with less than 10 Ah capacity, three main types of quasi hermetic cells are fabricated. These are cylindrical, prismatic and thin pouch type cells. All of these are incorporated by reference described in detail in Chapter 35 of the Handbook of Batteries, 3rd Ed. (see, Linden, David, and Reddy, Thomas B., eds. Handbook of Batteries (3rd ed. New York: McGraw Hill, 2002. 35.31-35.34 and 35.71-35.74).

Cylindrical cells consist of a metal can that is either pre-welded or in some cases drawn through a forming process. A wound electrochemical cell stack (defined below) is typically utilized in such batteries and a volumetrically efficient top cap is sealed on the cell. Cylindrical cells have very little excess volume associated with forming a hermetic or near-hermetic seal. Unfortunately, cylindrical cells are not volumetrically efficient in design when incorporated within prismatic spaces. In addition, cylindrical cells, due to their round cross section, do not pack together efficiently.

Prismatic cells are frequently formed by a deep drawing process of cans, usually consisting of aluminum. Prismatic cells also make very efficient use of volume as there is also very little volume associated with forming a hermetic or near hermetic seal. Unfortunately, these cells are not ideal for applications requiring thin, i.e., less than a few millimeters thick, cells for two reasons. The first reason is that the thinness of the void formed for the cell stack is limited by the fabrication process and the second reason is that the thinness of the material for the package wall is mechanically limited.

Industry has developed a solution to fabricate cells less than a few millimeters thick by utilizing the third approach, pouch type construction. Such cells utilize a flexible multi-layer material as the packaging material which is usually 150-200 m thick as those described in Low-Cost Flexible Packaging for High-Power Li-Ion HEV Batteries by Jansen, A. N., et al., (see Jansen, A. N., K. Amine, and G. L. Henriksen. Low-Cost Flexible Packaging for High-Power Li-Ion HEV Batteries. United States: N. p., 2004. Web. doi: 10.2172/828774). An electrochemical cell stack similar in composition, but not shape format, to what is utilized in the cylindrical and prismatic cells is utilized within the packaging.

As defined herein, an "electrochemical cell stack" consists of a positive current collector, a positive electrode attached to positive current collector, a porous separator, and a negative electrode, a negative electrode attached to a negative current collector. A liquid or solid-state electrolyte is dispersed within the positive electrode, negative electrode, and separator. In the case of a solid-state electrolyte, the electrolyte itself may be utilized as the separator if it is mechanically viable to maintain the separation between the positive and negative electrodes. The components of the cell stack are in contact or physically bonded with each other. The positive electrode typically consists of an active positive electrode material along with carbon and a suitable binder. The negative electrode can be a composition of negative active material, carbon and binder. Alternatively, the negative electrode could comprise a metal. For lithium batteries, the positive active electrode material may comprise atomically layered transition metal oxides such as $LiCoO_2$, $LiNiO_2$, or other layered materials comprising 1st row transition metals and Al to replace the Co or Ni in various proportions. Other positive electrodes include, but are not limited to $LiMn_2O_4$ based spinels operating at approximately 4V vs. Li/Li+ and also Mn based spinels such as $LiMn1.5Ni0.5O4$ which operate at higher voltages approaching 4.7 vs Li/Li+, and metal fluorides electrodes such as those based on $FeF_2$, $FeF_3$, $BiF_3$ and associated compositions formed into nanocomposites. See, e.g., Amatucci, G. G. and Pereira, N. "Fluoride based electrode materials for advanced energy storage devices." Journal of Fluorine Chemistry 128 (2007): 243-262, which is hereby incorporated by reference herein in its entirety.

Negative active electrode materials for lithium batteries may comprise graphite, hard carbons, cokes, and metal alloys, especially those comprised of Si, Al, and Ge. For example, see Zhang, W. "A review of the electrochemical performance of alloy anodes for lithium-ion batteries." Journal of Power Sources 196 (2011): 13-24, and Huggins, Robert A. "Chapter 18." Energy Storage. New York: Springer (2010), both of which are hereby incorporated by reference herein in their entireties. Carbon additives such as carbon blacks, graphites, carbon nanotubes and graphene are added to enhance the electronic conductivity. Lithium metal may be used in the case of a lithium metal battery. Binders can comprise a Polyvinylidene fluoride (PvDF), a Poly (vinylidene fluoride-co-hexafluoropropylene) (PvDF-HFP), a Cellulose, a Polytetrafluoroethylene (PTFE), a Polyacrylonitrile (PAN), a Poly(ethylene oxide) (PEO), a styrene-butadiene rubber (SBR) or others. Lithium and lithium-ion cells and batteries are discussed at length in Tarascon, J. M., and M. Armand. "Issues and Challenges Facing Recharge-able Lithium Batteries." Nature Magazine 414 (2001): 359-67 and Scrosati, B., and J. Garche. "Lithium Batteries: Status, Prospects and Future." Journal of Power Sources 195 (2010): 2419-430, both of which are hereby incorporated by reference herein in their entireties. Suitable processes to accomplish bonding of electrodes to form electrochemical cell stacks ("12" in FIG. 3) are provided, for example without limitation, by Tarascon, J. M., et al. "Performance of Bellcore's Plastic Rechargeable Li-ion Batteries." Solid State Ionics 86-88 (1996): 49-54, and by Armand, M. (2001) (cited above) and Stephan, A. M. "Review on Gel Polymer Electrolytes for Lithium Batteries." European Polymer Journal 42 (2006): 21-42, both of which are hereby incorporated by reference herein in their entireties.

The cell stack is placed within multi-laminate packaging material. Typically, such packaging consists of an inner thermoplastic sealant such as a polyolefin or acid modified polyolefin, a thin metal barrier and an external polymer coating which grants robustness to mechanical damage. Unfortunately, such packaging materials are still extremely volume inefficient for two reasons. The first reason is that such packaging is quite thick, commonly exceeding 100 to 300 microns. Thus, the packaging represents a significant portion of the cross-section thickness for a cell that is a couple of millimeters thick. The second reason is that, to form the pouch around the electrochemical cell, the package must be sealed on at least three sides. The seals need to maintain a relatively wide width in excess of a few mm for two reasons, the mechanical integrity of the seal, and the long path length needed to maintain quasi hermeticity. Regarding the latter, the entire package contains a metal film which grants near hermetic properties, but the seal has a polymer inner layer. This inner layer offers limited resistance to the transfer of electrolyte solvents out of the package and water into the package. To limit the transfer of solvents and water, the path length of the seal must be wide enough to ensure the long-term viability of the electrochemical cell as no polymer is truly hermetic. Pouch type cells are effective for thinner format applications, but unfortunately present significant barriers to further improvement to address energy needs of small footprint cells. These barriers include, but are not limited to, package thickness, seal width and hermeticity, each of which is discussed below.

Package thickness: As discussed, the industry standard multi-laminate package comprises three layers, an inner thermoplastic bonding layer, an interior metal film to maintain a hermetic barrier, and an outer insulative layer which grants mechanical robustness. Together, these layers make a multi-laminate structure of 100-300 microns thickness.

Seal width: The seal width is 3-6 mm wide, this, depending on the areal foot print of the cell, further reduces the volume available for the electrochemical cell and reduces the available capacity beyond which is already reduced by the package thickness.

Hermeticity: The seals offer a pathway for the electrolyte solvents to leave the cell and water to enter the cell as no polymer seal in multilaminate packaging is truly hermetic.

It is clear from the above that a viable pathway to small thin, high capacity electrochemical cells is limited by the packaging. The combination of the thick multi-laminate film and wide thermal seals utilized in packaging severely limits the volume % that can be allotted to the electrochemical cell to well below 50% for thin small cells.

DISCLOSURE OF THE INVENTION

The described invention relates to enclosures for electrochemical cells, especially non-aqueous electrochemical cells. More particularly, the present disclosure relates to an electrochemical energy storage cell including an electrochemical cell comprising a positive electrode, separator/electrolyte and a negative electrode; an electronically conductive barrier configured to surround and enclose the electrochemical cell establishing both hermeticity and in a preferred configuration, the ability to act as separate current collectors for the positive and negative electrodes, the barrier comprising a first electronically conductive barrier member and a second electronically conductive barrier member; wherein the first electronically conductive barrier member includes a first central portion bonded to the positive electrode, and a first peripheral portion extending away from the positive electrode; wherein the second electronically conductive barrier member includes a second central portion bonded to the negative electrode, and a second peripheral portion extending away from the negative electrode; and a cold weld seal formed between the first and second peripheral portions; and an inorganic insulating film(s) disposed between the first and second peripheral portions, proximate the cold weld seal, wherein the film has an electronically resistive property which electronically isolates the two electronically conductive barriers.

As defined herein, and not bound by theory, "cold weld" is a process where a ductile metal is added at the interface between two materials to be bonded. Upon the application of pressure with or without mild heat, the native oxide of the ductile metal breaks down enabling rapid bond to the two materials creating a hermetic bond.

In some embodiments, at least one of the first electronically conductive barrier member and the second electronically conductive barrier member is configured to function as a current collector for the positive and/or negative electrode.

In some embodiments, the cold weld seal is formed from a metal.

In some embodiments, the metal has a melting temperature in a range of 30° C. to 300° C.

In some embodiments, the metal is selected from the group consisting of Indium, Gallium, Lead, Tin, Silver, and Lithium.

In some embodiments, the cold weld seal has a width between 0.05 mm and 1 mm.

In some embodiments, the cold weld seal has a width between 0.05 mm and 0.5 mm.

In some embodiments, the cold weld seal has a width between 0.1 mm and 0.25 mm.

In some embodiments, the inorganic insulating film comprises at least one of an oxide, a fluoride, a borate, a phosphate or a nitride.

In some embodiments, the inorganic insulating film is an oxide.

In some embodiments, the inorganic insulating film has a thickness between 100 nm and 5,000 nm.

In some embodiments, the cold weld seal encompasses between 75% and 100% of an outer seal of the electrochemical cell.

In some embodiments, the first electronically conductive barrier member comprises at least one of Al, Au, Pt, Fe, Ag, Bi, Pd, Stainless steel and Ti.

In some embodiments, the second electronically conductive barrier member comprises at least one of Ni, Cu, Ta, Mo, Al, Mg, Zn, Stainless steel and Ti.

In some embodiments, the electrochemical energy storage cell includes a porous separator disposed between the positive and negative electrodes.

In some embodiments, the electrochemical energy storage cell includes one of a liquid-state electrolyte or a solid-state electrolyte dispersed within the positive electrode, the negative electrode, and the porous separator.

In some embodiments, the positive electrode comprises an active positive material, a carbon and a binder.

In some embodiments, the negative electrode comprises an active negative material, a carbon and a binder.

In some embodiments, at least one of the first and second electronically conductive barrier members comprises a multifunctional metal foil.

In some embodiments, the multifunctional metal foil has thickness of 10 to 40 microns.

In some embodiments, the electrochemical cell has a capacity of 0.00001 Ah to 10 Ah.

In some embodiments, the electrochemical cell is a lithium-ion battery.

In some embodiments the electrochemical cell is a Lithium battery.

In some embodiments the electrochemical cell is an electrochemical double layer capacitor.

In some embodiments the electrochemical cell is a fluoride-ion battery.

In some embodiments the electrochemical cell is a magnesium battery.

The present invention addresses all the aforementioned deleterious attributes of pouch, cylindrical and prismatic cells especially when applying to thin, small format electrochemical cells such as electrochemical double layer capacitors or batteries. This invention relates to an electrochemical cell consisting of a very efficient use of foil packaging, especially for electrochemical cells with a cell thicknesses less than 5 mm. One unique aspect of the electrochemical cell is that the foil packaging is also the negative and positive current collector. The electrodes of the cell are electronically bonded to the foil. The multifunctional barrier/current collector has an additional advantage as a current collector tab does not have to be brought through the packaging in a separate feedthrough which consumes considerable volume especially in small cells. The foil of the multifunctional barrier/current collector is extended slightly around the perimeter of the cell and said foil is sealed by a "cold weld" to create a hermetic metal to metal bond. This seal embodies the focus of this invention. The specific invention relates to the composition and structure of the seal. The innovation enables the creation of a fully hermetic seal enabled by a metallic cold weld of narrow dimension which is electronically insulated between the positive and negative multifunctional barrier by an insulative film. Furthermore, the selection of the metal for the weld enables such seals to be established at low temperatures without damaging the electrochemical cell contained within.

In an embodiment, the electrochemical cell of the invention is comprised of an electrochemical stack. Such stacks have a generic format common to most batteries and electrochemical double layer capacitors.

In an embodiment, the multifunctional barrier/current collector of the invention is a multifunctional metal foil. The metal foil not only acts as a hermetic barrier, but also as a current collector for the positive and negative electrodes. The positive multifunctional current collector is bonded to the positive electrode. The negative multifunctional current collector is bonded to the negative electrode. The two multifunctional current collectors are sealed together to form a hermetic seal without causing the two foils to be in electronic contact, which would electronically short the electrochemical cell.

BEST MODE FOR CARRYING OUT THE INVENTION

Figures 1, 2, 3:
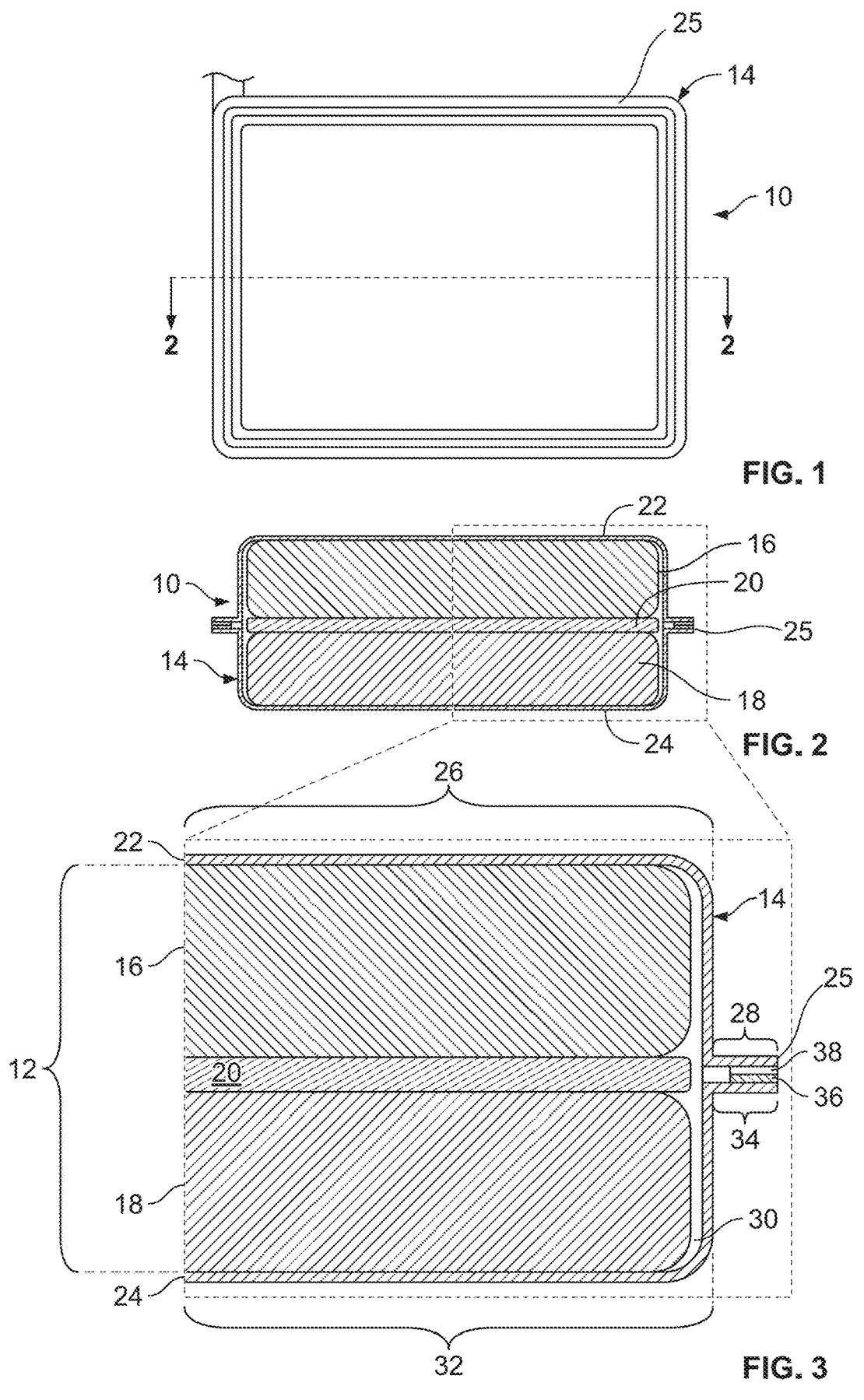
FIG. 1 is a top view of an exemplary embodiment of the electrochemical cell enclosure.
FIG. 2 is a cross-sectional view of the electrochemical cell enclosure of FIG. 1, taken along line 2-2 thereof.
FIG. 3 is a detailed cross-sectional view of the electrochemical cell enclosure of FIG. 2, in the box 3 thereof.

The present invention relates to an enclosure for an electrochemical energy storage cell. In some embodiments, the electrochemical energy storage cell is a battery or electrochemical double layer capacitor. In some embodiments where the electrochemical energy storage cell is a battery, it may be a lithium metal or lithium-ion battery.

In some embodiments, the electrochemical cell has a capacity between 0.00001 Ah and 10 Ah. In other embodiments, the electrochemical cell has a capacity between 0.0001 Ah and 10 Ah. In other embodiments, the electrochemical cell has a capacity between 0.001 Ah and 10 Ah. In other embodiments, the electrochemical cell has a capacity between 0.01 Ah and 10 Ah. In other embodiments, the electrochemical cell has a capacity between 0.1 Ah and 10 Ah. In other embodiments, the electrochemical cell has a capacity between 1 Ah and 10 Ah.

In some embodiments, the electrochemical cell has a capacity between 0.00001 Ah and 1 Ah. In other embodiments, the electrochemical cell has a capacity between 0.00001 Ah and 0.01 Ah. In other embodiments, the electrochemical cell has a capacity between 0.00001 Ah and 0.001 Ah. In other embodiments, the electrochemical cell has a capacity between 0.00001 Ah and 0.01 Ah. In other embodiments, the electrochemical cell has a capacity between 0.00001 Ah and 1 Ah.

In some embodiments, the electrochemical cell has a capacity between 0.00001 Ah and 0.0001 Ah. In other embodiments, the electrochemical cell has a capacity between 0.0001 Ah and Ah. In other embodiments, the electrochemical cell has a capacity between 0.001 Ah and Ah. In other embodiments, the electrochemical cell has a capacity between 0.01 Ah and 0.1 Ah. In other embodiments, the electrochemical cell has a capacity between 0.01 Ah and 0.5 Ah.

In some embodiments, the electrochemical energy storage cell has a thickness between mm and 10 mm. In other embodiments, the electrochemical energy storage cell has a thickness between 0.1 mm and 10 mm. In other embodiments, the electrochemical energy storage cell has a thickness between 1 mm and 10 mm. In other embodiments, the electrochemical energy storage cell has a thickness between 5 mm and 10 mm.

In some embodiments, the electrochemical energy storage cell has a thickness between 0.02 mm and 5 mm. In other embodiments, the electrochemical energy storage cell has a thickness between 0.02 mm and 2 mm. In other embodiments, the electrochemical energy storage cell has a thickness between 0.02 mm and 1 mm. In other embodiments, the electrochemical energy storage cell has a thickness between 0.02 mm and 0.1 mm.

In some embodiments, the electrochemical energy storage cell has a thickness between 5 mm and 10 mm. In other embodiments, the electrochemical energy storage cell has a thickness between 1 mm and 5 mm. In other embodiments, the electrochemical energy storage cell has a thickness between 0.1 mm and 0.5 mm. In other embodiments, the electrochemical energy storage cell has a thickness between 0.02 mm and 0.1 mm.

As further discussed below, in some embodiments, the electrochemical cell of the present invention utilizes a multifunctional metal foil packaging that is intimately and electronically bonded to one or more electrodes of an electrochemical cell, wherein the foil packaging acts as a current collector, and thereby saves significant weight and especially volume. In some embodiments, the electrochemical energy storage cell of the present invention utilizes a hermetic perimeter seal comprised of a "cold weld". As discussed below, a cold weld is a weld performed at low temperatures. In some embodiments, the cold weld is performed at room temperature. In other embodiments, the temperature at which the cold weld is performed is below 300°, as further discussed below.

In some embodiments, the hermetic seal of this invention encompasses between 75% and 100% of the perimeter seals (i.e., the outer seal of the electrochemical cell). In other embodiments, the weld encompasses between 75% and 95% of the perimeter seals. In other embodiments, the weld encompasses between 75% and 90% of the perimeter seals. In other embodiments, the weld encompasses between 75% and 85% of the perimeter seals. In other embodiments, the weld encompasses between 75% and 80% of the perimeter seals.

In some embodiments, the hermetic seal of this invention encompasses between 80% and 100% of the perimeter seals (i.e., the outer seal of the electrochemical cell). In other embodiments, the weld encompasses between 85% and 100% of the perimeter seals. In other embodiments, the weld encompasses between 90% and 100% of the perimeter seals. In other embodiments, the weld encompasses between 95% and 100% of the perimeter seals.

In other embodiments, the weld encompasses between 75% and 80% of the perimeter seals. In other embodiments, the weld encompasses between 80% and 85% of the perimeter seals. In other embodiments, the weld encompasses between 85% and 90% of the perimeter seals. In other embodiments, the weld encompasses between 90% and 95% of the perimeter seals. The weld thereby reduces the overall volume of the electrochemical cell and improves long life robustness thereof.

In some embodiments, the perimeter seal of the electrochemical energy storage cell is between 0.02 mm and 5 mm (5,000 microns) wide. In other embodiments, the perimeter seal of the electrochemical energy storage cell is between 0.02 mm and 2 mm wide. In other embodiments, the perimeter seal of the electrochemical energy storage cell is between 0.02 mm and 1.5 mm wide. In other embodiments, the perimeter seal of the electrochemical energy storage cell is between 0.02 mm and 0.5 mm wide. In other embodiments, the perimeter seal of the electrochemical energy storage cell is between 0.02 mm and 0.25 mm wide. In other embodiments, the perimeter seal of the electrochemical energy storage cell is between 0.02 mm and 0.1 mm wide.

In some embodiments, the perimeter seal of the electrochemical energy storage cell is between 0.1 mm and 5 mm wide. In other embodiments, the perimeter seal of the electrochemical energy storage cell is between 0.5 mm and 5 mm wide. In other embodiments, the perimeter seal of the electrochemical energy storage cell is between 1 mm and 5 mm wide. In other embodiments, the perimeter seal of the electrochemical energy storage cell is between 1.5 mm and 5 mm wide. In other embodiments, the perimeter seal of the electrochemical energy storage cell is between 2 mm and 5 mm wide. In other embodiments, the perimeter seal of the electrochemical energy storage cell is between 2.5 mm and 5 mm (500 microns) wide. In other embodiments, the perimeter seal of the electrochemical energy storage cell is between 0.05 mm and 0.2 mm wide.

In some embodiments, the perimeter seal of the electrochemical energy storage cell is between 0.1 mm and 5 mm away from the electrochemical cell (i.e., the cell stack). In other embodiments, the perimeter seal of the electrochemical energy storage cell is between 0.5 mm and 1 mm away from the electrochemical cell. In other embodiments, the perimeter seal of the electrochemical energy storage cell is between 0.1 mm and 0.5 mm away from the electrochemical cell. In other embodiments, the perimeter seal of the electrochemical energy storage cell is between 1.5 mm and 2 mm away from the electrochemical cell. In other embodiments, the perimeter seal of the electrochemical energy storage cell is between 1 mm and 1.5 mm away from the electrochemical cell. In other embodiments, the perimeter seal of the electrochemical energy storage cell is between 1 mm and 2 mm away from the electrochemical cell. In other embodiments, the perimeter seal of the electrochemical energy storage cell is between 0.05 mm and 2 mm away from the electrochemical cell.

The key inventive embodiments of this invention relate to specific aspects of the hermetic seal. The seal structure comprises (1) two multifunctional metal foil barrier current collectors, wherein at least one of the barrier's interior surfaces contains a surface film of an inorganic insulator; and (2) metal added to the surface of one or both of the two multifunctional metal foil barriers to bond them together.

In some embodiments, the multifunctional metal foil barriers are pore free and electrochemically stable with the positive or negative electrode of the electrochemical cell for which it is associated with. The inorganic insulator may be formed from an oxide, a fluoride, a borate, a phosphate or a nitride applied as a separate film in some embodiments. In other embodiments the base metal of the barrier is converted into an inorganic insulator. In the latter embodiment the inorganic insulator will always have a chemical element common with that of the multifunctional metal foil barrier. In some embodiments, the inorganic insulator converted from the base metal of the barrier/current collector may be performed by the appropriate exposure to oxidizing, fluorinating and nitriding gases, chemical or electrochemical treatments such as anodization. Anodization of aluminum is used as an example of the latter.

In some embodiments, the metal added to the surface of one or both of the two multifunctional metal foil barriers is a metal which bonds to the opposed surfaces of the barriers at very low temperatures through the application of pressure or pressure and moderate temperature. In some embodiments, the metal has a melting temperature between 30° C. and 300° C. In other embodiments, the metal has a melting temperature between 100° C. and 300° C. In other embodiments, the metal has a melting temperature between 150° C. and 300° C. In other embodiments, the metal has a melting temperature between 200° C. and 300° C. In other embodiments, the metal has a melting temperature between 250° C. and 300° C.

In some embodiments, the metal has a melting temperature between 30° C. and 250° C. In other embodiments, the metal has a melting temperature between 30° C. and 200° C. In other embodiments, the metal has a melting temperature between 30° C. and 150° C. In other embodiments, the metal has a melting temperature between 30° C. and 100° C.

In other embodiments, the metal has a melting temperature between 150° C. and 200° C. In other embodiments, the metal has a melting temperature between 100° C. and 150° C. In other embodiments, the metal has a melting temperature between 150° C. and 250° C. In other embodiments, the metal has a melting temperature between 200° C. and 250° C. In other embodiments, the metal has a melting temperature between 30° C. and 150° C.

In some embodiments, the metal has good bonding properties to both surfaces. In some embodiments, the metal is adept at bonding via a "cold weld" process where only pressure and no additional heat is needed to enable the bond between the two opposed surfaces. In various embodiments, the metal is at least one of the following metals: Indium, Gallium, Lead, Tin, Silver or Lithium.

FIGS. 1-3 illustrate an exemplary embodiment of an electrochemical cell assembly, 10, including an electrochemical cell 12 (i.e., an electrochemical cell stack) and a barrier, or enclosure, 14 surrounding the electrochemical cell 12. In this embodiment, the electrochemical cell 12 includes a positive electrode 16, a negative electrode 18 and a porous separator or solid-state electrolyte 20 disposed between the positive and negative electrodes 16, 18 (see FIGS. 2 and 3). In some embodiments, these elements are bonded to each other. In some embodiments, bonding may be induced by mechanical or chemical means. In some embodiments, the bonding will be induced by thermal energy and pressure, enabling thermoplastic polymers to melt bond between the respective elements. In some embodiments, the relative positions of the positive and negative electrodes 16, 18 may be reversed in alternate embodiments.

In some embodiments, a liquid or solid-state electrolyte is dispersed within the positive electrode 16, negative electrode 18, and porous separator 20. In the case of a solid-state electrolyte, the electrolyte itself may be utilized as the separator if it is mechanically viable to maintain the electronic isolation between the positive and negative electrodes 16, 18 while still maintaining viable ionic conductivity.

In some embodiments, the positive electrode 16 includes an active positive electrode material along with carbon and a suitable binder. In some embodiments, the negative electrode 18 can be of similar composition of an active negative electrode material, carbon and binder. In alternate embodiments, the negative electrode 18 is formed from a metal. In some embodiments, for lithium batteries, the positive active electrode material of a lithium battery may comprise layered transition metal oxides such as $LiCoO2$, $LiNiO2$, or other layered materials comprised of 1st row transition metals and Al to replace the Co or Ni in various proportions. Other exemplary positive electrodes include, but are not limited to $LiMn2O4$ based spinels operating at approximately 4V vs. $Li/Li+$ and also Mn based spinels such as $LiMn1.5Ni0.5O4$ which operate at higher voltages approaching 4.7 vs $Li/Li+$, and metal fluorides electrodes such as those based on $FeF2$, $FeF3$, $BiF3$ and associated compositions formed into nancomposites. In some embodiments, negative active electrode materials for lithium batteries are comprised of graphite, hard carbons, cokes, and metal alloys, especially those comprised of Si, Al, and Ge. In some embodiments, Lithium metal may be used in the case of a lithium metal battery. In some embodiments, carbon additives such as carbon blacks, graphites, carbon nanotubes and graphene are added to enhance the electronic conductivity. In some embodiments, binders can comprise PvDF, PvDF-HFP, Cellulose, PTFE, PAN, PEO, SBR or others, as discussed and referenced in the publications identified above.

With continued reference to FIGS. 2 and 3, in some embodiments, the barrier 14 includes a first electronically conductive barrier member 22 and a second electronically conductive barrier member 24. In these embodiment, the first barrier member 22 includes a first central portion 26 that is bonded to the positive electrode 16, and a first peripheral portion 28 that extends away from the positive electrode 16 and is not in contact with it. In some embodiments, the electrochemical cell assembly 10 includes an edge electronic insulator 30 disposed between the positive electrode 16 and/or separator 20 and/or negative electrode 18 and the first peripheral portion 28 of the first barrier member 22. In some embodiments, the second barrier member 24 includes a second central portion 32 that is bonded to the negative electrode 18 and a second peripheral portion 34 that extends away from the negative electrode 18 and is not in contact with it. In some embodiments, the edge insulator 30 is also disposed between the negative electrode 18 and the second peripheral portion 34 of the second barrier member 24.

In some embodiments, one or both the first and second barrier members 22, 24 of the enclosure 14 also function as current collectors. In some embodiments, the first barrier member 22, bonded to the positive electrode 16, functions as a positive current collector, and the second barrier member 24, bonded to the negative electrode 18, functions as a negative current collector.

In some embodiments, the first and second barrier members 22, 24 are formed from a multifunctional metal foil. The metal foil not only acts as a hermetic barrier, but also as a current collector for the positive and negative electrodes 16, 18. The first barrier member 22 constitutes a positive multifunctional current collector that is bonded to the positive electrode 16. The second barrier member 24 constitutes a negative multifunctional current collector is bonded to the negative electrode 18. The barrier members/multifunctional current collectors 22, 24 are sealed together to form a hermetic, outer perimeter seal 25, but without causing the two foils of the barrier members 22, 24 to be in electronic contact with one another, which would electronically short the electrochemical cell 12.

If the metal foil is utilized as a negative current collector in a lithium battery, Ni, Cu, Ta, Mo, Mg, Zn and Ti and their respective alloys are exemplary examples of chemical compositions of the foil. If the metal foil is used as the positive current collector, exemplary examples of chemical compositions of the foil includes metals such as Al, Au, Bi, Ag, Fe, Pt, Pd, and Ti. The foils of 10-40 microns in thickness are of approximately an order of magnitude thinner than the thickness of typical multi-laminate packaging.

In some embodiments, the barrier 14 (i.e., the first and second barrier members 22, 24) is molded by press or vacuum forming, to form a well, pan, or cup or other appropriate shaped receptacle for receiving the electrochemical cell 12 therein.

As described above, in some embodiments, the first central portion 26 of the first barrier member 22 of the barrier 14 is attached fully or in part to the positive electrode 16, and the second central portion 32 of the second barrier member 24 is attached fully or in part to the negative electrode 18. In various embodiments, the first and second barrier members 22, 24 are bonded to the respective positive and negative electrodes 16, 18 using a variety of acid-modified polymers. In some embodiments, these polymers may be placed on the barrier members 22, 24 (e.g., the foil forming the barrier member) or the electrodes 16, 18. In these embodiments, the acid groups of these polymers react with the native oxides on the surface of the foil barriers 22, 24 to create a bond under heat and pressure. In some embodiments, such polymers may be mixed with electronically conductive additives such as carbon to improve electronic conductivity between the current collector package and the electrode. Examples of such polymers include, but are not limited to, EB-20 (Acheson) and ADX (Arkema). EB-20 is an acid modified polyolefin, and ADX is an acid-modified PvDF homo- or co-polymer.

In alternate embodiments, positive and negative current collectors are included within the electrochemical cell stack assembly 12, for example, if the electrochemical cell stack assembly 12 is wound or folded within the packaging of this invention. In this case, in some embodiments, the metal current collectors incorporated within the electrochemical assembly 12 may be directly welded or electronically epoxied to the interior surface of its corresponding positive or negative multifunctional barrier/current collector. In some embodiments, welding may be through thermal, ultrasonic, or resistance welding.

In some embodiments, after electrolyte is added to the electrochemical cell assembly 10, the first and second barrier members 22, 24 are sealed to each other (i.e., at their respective peripheral portions 28, 34) to create a hermetic barrier preventing intrusion of moisture or air into the electrochemical cell 12. In order for the metal based hermetic seal formed in the area 28/34 to remain electronically insulating it is necessary for at least one of the interior surface of barrier 22 and 24 in the area of 28 and 24, respectively to have an inorganic electronically insulating film on it (example of coating on 22 is shown as 38 in FIG. 3). This inorganic electronically resistive film can comprise an electronically insulating metal oxide, a fluoride, a borate, a phosphate or a nitride. In some embodiments, the inorganic insulating film has a thickness between 100 nm and 10,000 nm. In other embodiments, the inorganic insulating film has a thickness between 500 nm and 10,000 nm. In other embodiments, the inorganic insulating film has a thickness between 1,000 nm and 10,000 nm. In other embodiments, the inorganic insulating film has a thickness between 2,000 nm and 10,000 nm. In other embodiments, the inorganic insulating film has a thickness between 5,000 nm and 10,000 nm. In other embodiments, the inorganic insulating film has a thickness between 7,000 nm and 10,000 nm. In other embodiments, the inorganic insulating film has a thickness between 9,000 nm and 10,000 nm. In other embodiments, the inorganic insulating film has a thickness between 1,000 nm and 8,000 nm.

In other embodiments, the inorganic insulating film has a thickness between 500 nm and 8,000 nm. In other embodiments, the inorganic insulating film has a thickness between 500 nm and 6,000 nm. In other embodiments, the inorganic insulating film has a thickness between 500 nm and 4,000 nm. In other embodiments, the inorganic insulating film has a thickness between 500 nm and 2,000 nm. In other embodiments, the inorganic insulating film has a thickness between 500 nm and 1,000 nm.

In other embodiments, the inorganic insulating film has a thickness between 1,000 nm and 8,000 nm. In other embodiments, the inorganic insulating film has a thickness between 1,000 nm and 2,000 nm. In other embodiments, the inorganic insulating film has a thickness between 2,000 nm and 4,000 nm. In other embodiments, the inorganic insulating film has a thickness between 4,000 nm and 6,000 nm. In other embodiments, the inorganic insulating film has a thickness between 6,000 nm and 8,000 nm. In other embodiments, the inorganic insulating film has a thickness between 8,000 nm and 9,000 nm.

In some embodiments, a low melting temperature metal is placed on one or both opposing face(s)/seal surface(s) of the first and second barrier members 22, 24 in the areas of 28 and 24, respectively (shown on one side, "36". In FIG. 3).

In various embodiments, the metal is indium, silver, lead, gallium, tin and/or lithium. It is preferred that the metal is isolated from the electrolyte utilized in cell stack 12. Pressure is then applied to the opposed face(s)/seal surface(s) of the first and second barrier members 22, 24, either alone or with low heat to form what is commonly called a "cold weld" 36. In such a process, not being held by theory, ductile, low modulus metal deforms under pressure. The thin native oxide coating on the metal surface breaks and forms fresh metal, which immediately bonds to the metal surface and to the inorganic insulating surface. This creates a very mechanically robust and hermetic sealant, due to the presence of the inorganic insulating surface, the seal is electronically insulating and does not result in an electronic short between the surfaces of the first and second barrier members 22, 24 (i.e., the positive and negative reactive current collectors).

In some embodiments, the temperature at which the cold weld is formed is room temperature. In other embodiments, the temperature at which the cold weld is formed is between −70° C. and 300° C. In other embodiments, the temperature at which the cold weld is formed is between 0° C. and 300° C. In other embodiments, the temperature at which the cold weld is formed is between 50° C. and 300° C. In other embodiments, the temperature at which the cold weld is formed is between 100° C. and 300° C. In other embodiments, the temperature at which the cold weld is formed is between 150° C. and 300° C. In other embodiments, the temperature at which the cold weld is formed is between 200° C. and 300° C. In other embodiments, the temperature at which the cold weld is formed is between 250° C. and 300° C.

In other embodiments, the temperature at which the cold weld is formed is between −70° C. and 250° C. In other embodiments, the temperature at which the cold weld is formed is between −70° C. and 200° C. In other embodiments, the temperature at which the cold weld is formed is between −70° C. and 150° C. In other embodiments, the temperature at which the cold weld is formed is between −70° C. and 100° C. In other embodiments, the temperature at which the cold weld is formed is between −70° C. and 50° C. In other embodiments, the temperature at which the cold weld is formed is between −70° C. and 0° C.

In other embodiments, the temperature at which the cold weld is formed is between-50° C. and 150° C. In other embodiments, the temperature at which the cold weld is formed is between 0° C. and 250° C. In other embodiments, the temperature at which the cold weld is formed is between 100° C. and 150° C. In other embodiments, the temperature at which the cold weld is formed is between 150° C. and 250° C. In other embodiments, the temperature at which the cold weld is formed is between 200° C. and 250° C. In other embodiments, the temperature at which the cold weld is formed is between −50° C. and 100° C. In other embodiments, the temperature at which the cold weld is formed is between 20° C. and 125° C.

In some embodiments, the ability to fabricate the seals at such low temperatures enables the seal/cold weld 36 to be in close proximity to the electrochemical cell 12, which contains a variety of extremely heat-sensitive components including, but not limited to, the liquid electrolyte, separator, and in the case of lithium metal batteries, the lithium metal itself. As opposed to the 2-6 mm wide seals of a multi-laminate packaged cell, the hermetic cold weld seals 36 of this invention are at least an order of magnitude smaller. In some embodiments, the cold weld seals have a width between 0.1 mm and 1 mm. In other embodiments, the cold weld seal has a width between 0.25 mm and 1 mm. In other embodiments, the cold weld seal has a width between 0.5 mm and 1 mm. In other embodiments, the cold weld seal has a width between 0.1 mm and 0.5 mm. In other embodiments, the cold weld seal has a width between 0.1 mm and 0.25 mm. In other embodiments, the cold weld seal has a width between 0.25 mm and 0.5 mm. In other embodiments, the cold weld seal has a width between 0.05 mm and 0.15 mm. In addition, the packaging thickness is near an order of magnitude thinner and acts as a current collector. These characteristics result in an electrochemical of extreme improvement of energy per volume and weight.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the described invention, exemplary methods and materials are now described. All publications mentioned herein are incorporated herein by reference to disclose and describe the methods and/or materials in connection with the publications are cited.

It must also be noted that as used herein and in the appended claims, the singular forms "a," "and" and "the" include plural referents unless the context clearly dictates otherwise. All technical and scientific terms used herein have the same meaning.

The publications discussed herein are provided solely for their disclosure prior to the filing date of the present application. Nothing herein is to be construed as an admission that the described invention is not entitled to antedate such publication by virtue of prior invention. Further, the dates of publication provided may be different from the actual publication dates which may need to be independently confirmed.

It should be understood by those skilled in the art that various changes may be made and equivalents may be substituted without departing from the true spirit and scope of the Invention. In addition, many modifications may be made to adapt a particular situation, material, composition of matter, process, process step or steps, to the objective, spirit and scope of the described invention. All such modifications are intended to be within the scope of the claims appended hereto.

The following examples are provided to further illustrate various non-limiting embodiments and techniques. It should be understood, however, that these examples are meant to be illustrative and do not limit the scope of the claims. As would be apparent to one of skill in the art, many variations and modifications are intended to be encompassed within the spirit and scope of the invention. All references and patents cited in this application are incorporated by reference in their entirety.

EXAMPLES

The following examples are put forth to provide those of ordinary skill in the art with a complete disclosure and description of how to make and use the described invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example: Fabrication of Enclosure for Electrochemical Cell

Further reference is made to FIGS. 1-3. First, the electrochemical cell stack 12 is fabricated.

The pan structure of the first barrier member 22 of the barrier 14 is fabricated of aluminum, and the second barrier member 24 is fabricated of stainless steel (i.e., multifunctional foils). The pan-like structure is derived from the forming process of the foil. The "pan" is the structure in which the cell stack sits. In some embodiments, the "pan structure" can be formed from the first and second barrier members 22, 24, as shown in the Figures. Alternatively, in other embodiments, the "pan structure" is formed from only on one of the barrier members. In these embodiments, the pan structure has a depth that is large enough to hold the electrochemical cell 12 and the second/opposed barrier member is a flat top cap.

Barrier member 22 is anodized at the seal area 28, creating the insulative inorganic film 38 of an oxide of approximately 2000 nm on an inside surface of the peripheral portion of the seal which then extends around the entire perimeter thereof. The insulative inorganic film 38 has a width of approximate 500 microns.

A low melting temperature metal such as Indium is placed on an inside surface of the second peripheral portion 34 of the second barrier member 24 at the entire perimeter thereof, opposite the insulative inorganic film 38. The metal layer has a width of approximately 250 microns.

The cell stack 12 is adhered together by hot pressing the cell stack 12 to a conductive, adhesive polyolefin coated on the inside surface of the second barrier member 24, in the area of the second central portion 32.

Liquid electrolyte is then added to the electrochemical cell stack 12.

The first barrier member is hot pressed to the cell stack 12, by the use of a conductive, adhesive polyolefin coating on the inside surface of the first barrier member 22, in the area of the first central portion 26.

Peripheral pressure is then applied to the first and second peripheral portions 28, 34 proximate the insulative inorganic film 38 and the metal and in order to form the hermetic cold weld seal 36.

The enclosed electrochemical cell 10 is then completed.

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto. All publications and patents cited in this specification are herein incorporated by reference in their entirety.

What is claimed is:

1. An electrochemical energy storage cell comprising:
an electrochemical cell comprising a positive electrode and a negative electrode;
an electronically conductive barrier configured to surround and enclose the electrochemical cell, the electronically conductive barrier comprising a first electronically conductive barrier member and a second electronically conductive barrier member, wherein each of the first electronically conductive barrier member and the second electronically conductive barrier member is configured to function as a current collector;

wherein the first electronically conductive barrier member includes a first central portion bonded to the positive electrode, and a first peripheral portion extending away from the positive electrode;

wherein the second electronically conductive barrier member includes a second central portion bonded to the negative electrode, and a second peripheral portion extending away from the negative electrode; and an outer perimeter seal between the first peripheral portion and the second peripheral portion, wherein the outer perimeter seal comprises a cold weld seal between the first peripheral portion and the second peripheral portion, wherein the cold weld seal seals the first peripheral portion and the second peripheral portion together, wherein the outer perimeter seal is a hermetic seal; and an inorganic insulating film disposed between the first peripheral portion and the second peripheral portion, proximate the cold weld seal, wherein the inorganic insulating film has an electronically resistive property which electronically isolates the first electronically conductive barrier and the second electronically conductive barrier.

2. The electrochemical energy storage cell of claim 1, wherein the cold weld seal is formed from a metal.

3. The electrochemical energy storage cell of claim 2, wherein the metal has a melting temperature in a range of 30° C. to 300° C.

4. The electrochemical energy storage cell of claim 2, wherein the metal is selected from the group consisting of Indium, Gallium, Lead, Tin, Silver, and Lithium.

5. The electrochemical energy storage cell of claim 1, wherein the cold weld seal includes a first end distal from the electrochemical cell, a second end opposite the first end, and a width from the first end to the second end, wherein the width is 0.050 mm and 1 mm.

6. The electrochemical energy storage cell of claim 5, wherein the width is 0.075 mm and 0.5 mm.

7. The electrochemical energy storage cell of claim 5, wherein the width is 0.1 mm and 0.25 mm.

8. The electrochemical energy storage cell of claim 1, wherein the inorganic insulating film comprises at least one of a metal oxide, a fluoride, a phosphate or a nitride.

9. The electrochemical energy storage cell of claim 1, wherein the inorganic insulating film is an oxide.

10. The electrochemical energy storage cell of claim 1, wherein the inorganic insulating film has a thickness of 100 nm and 8,000 nm.

11. The electrochemical energy storage cell of claim 1, wherein the cold weld seal is 75% to 100% of a length of the outer perimeter seal.

12. The electrochemical energy storage cell of claim 1, wherein the first electronically conductive barrier member comprises at least one of Al, Au, Pt, Fe, Ag, Bi, Pd, Stainless steel and Ti.

13. The electrochemical energy storage cell of claim 1, wherein the second electronically conductive barrier member comprises at least one of Ni, Cu, Ta, Mo, Mg, Zn, Al, Stainless steel and Ti.

14. The electrochemical energy storage cell of claim 1, further comprising a porous separator disposed between the positive and negative electrodes.

15. The electrochemical energy storage cell of claim 14, further comprising one of a liquid-state electrolyte or a solid-state electrolyte dispersed within the positive electrode, the negative electrode, and the porous separator.

16. The electrochemical energy storage cell of claim 1, wherein the positive electrode comprises an active positive material, a carbon and a binder.

17. The electrochemical energy storage cell of claim 1, wherein the negative electrode comprises an active negative material, a carbon and a binder.

18. The electrochemical energy storage cell of claim 1, wherein at least one of the first and second electronically conductive barrier members comprises a multifunctional metal foil configured to act as the hermetic seal and the current collector of the at least one of the first and second electronically conductive barrier members.

19. The electrochemical energy storage cell of claim 18, wherein the multifunctional metal foil has thickness of 10 to 40 microns.

20. The electrochemical energy storage cell of claim 1, wherein the electrochemical cell has a capacity of 0.0001 Ah to 10 Ah.

21. The electrochemical energy storage cell of claim 1, wherein the electrochemical cell is a lithium-ion battery.

22. The electrochemical energy storage cell of claim 1, wherein the electrochemical cell is a Lithium battery.

23. The electrochemical energy storage cell of claim 1, wherein the electrochemical cell is an electrochemical double layer capacitor.

24. The electrochemical energy storage cell of claim 1, wherein the electrochemical cell is a fluoride-ion battery.

25. The electrochemical energy storage cell of claim 1, wherein the electrochemical cell is a magnesium battery.

* * * * *